350-362 SR

XR 3,612,758

United States Patent

[11] 3,612,758

[72] Inventors Paul F. Evans
Pittsford;
Harold D. Lees, Henrietta; Martin S. Maltz, Fairport; John L. Dailey, Pittsford, all of N.Y.

[21] Appl. No. 863,633
[22] Filed Oct. 3, 1969
[45] Patented Oct. 12, 1971
[73] Assignee Xerox Corporation
Rochester, N.Y.

[54] COLOR DISPLAY DEVICE
14 Claims, 9 Drawing Figs.

[52] U.S. Cl. .......... 178/5.4 R, 178/7.3 D, 315/169 TV, 350/161
[51] Int. Cl. .......... G02f 1/36, H04n 5/66, H04n 9/12
[50] Field of Search .......... 350/160, 161, 267, 266, 290; 178/7.3 D, 5.4; 315/169 TV; 204/299

[56] References Cited
UNITED STATES PATENTS

| | | | |
|---|---|---|---|
| 3,383,993 | 5/1968 | Shu-Hsiung Yeh .......... | 204/299 |
| 3,477,934 | 11/1969 | Carreira et al. .......... | 204/299 |

*Primary Examiner*—Robert L. Griffin
*Assistant Examiner*—John C. Martin
*Attorneys*—John E. Beck, James J. Ralabate and Laurence A. Wright

ABSTRACT: A color display device employing the electrophoretic migration of color pigment particles to form an image on a matrix addressable panel. One coordinate terminal is connected to a line reservoir containing electrophoretic ink particles of a given polarity while the other coordinate terminal is connected to a transparent conductor. The panel is viewed through the transparent conductor side in ambient illumination.

Figure 1:
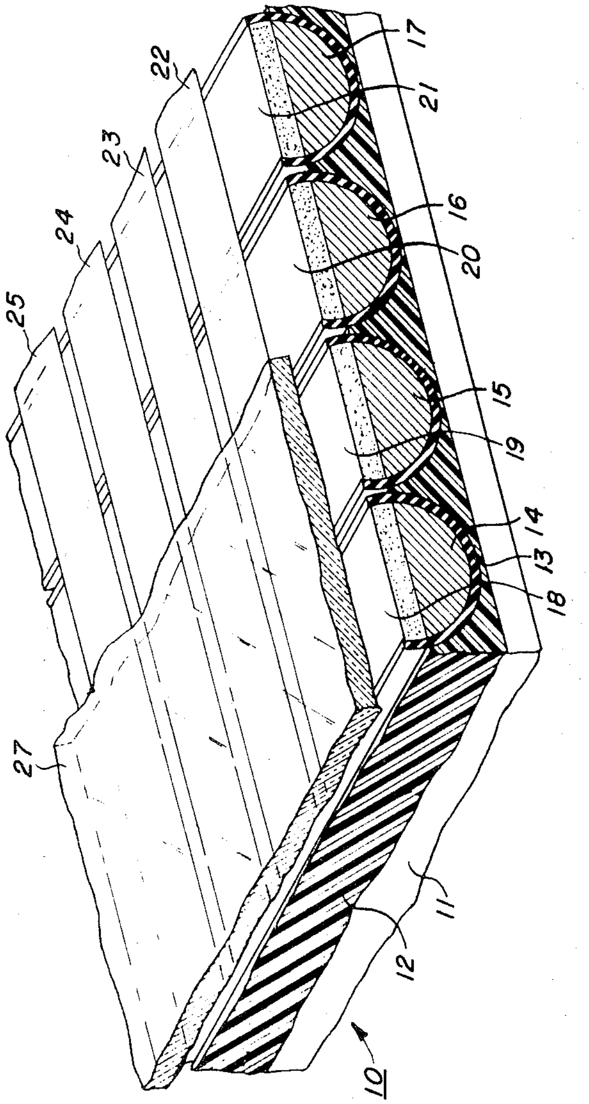

INVENTORS
PAUL F. EVANS
HAROLD D. LEES
MARTIN S. MALTZ
JOHN L. DAILEY
BY Laurence A. Wright
ATTORNEY

COLOR DISPLAY DEVICE

This invention relates to visual panel display devices. Specifically, the invention relates to a color panel display device wherein images or patterns are formed on the display by electrophoretic migration of particles.

BACKGROUND OF THE INVENTION

There has been considerable interest in display panel devices generally since they may afford the answer to a workable flat screen television which permit large information displays and which are observable by many individuals simultaneously. Other uses or applications of panel displays may be in radar plotting and readout of computer data.

Panel display devices have certain distinct advantages over conventional cathode-ray tubes which have become a standard visual display device. First of all they obviate the need for deflection coils and associated power consuming circuitry. Secondly, panel displays as opposed to cathode-ray tubes are capable of being constructed in large sizes such as 3×4′, 4×5′ and up to 20×40′ and they may be made to give high light outputs with good contrast and resolution. Thirdly, the devices are relatively insensitive to vibration and shock and the space required with regard to depth is minimal.

The electroluminescent-panel-type display which is somewhat related to the invention is a flat device in that its depth is usually a much smaller dimension than its square area dimension. In the conventional electroluminescent panel display device a layer of luminescent or phosphor material is sandwiched between electrodes and the combination deposited on a substrate such as glass. See for example, U.S. Pat. No. 2,932,770 to Livingston. Generally, the electroluminescent material is made of phosphor which emits light when a changing electric field is applied across the electrodes. In an X–Y or matrix addressable panel the electrodes may be set up in a grid configuration. Thus, a specific area of the phosphor layer may be addressed by applying a coincident voltage to selected conductors of the x and Y group. Devices of this kind may be considered a transducer in that it converts an electrical input to an optical output adapted for human observation.

Although electroluminescent panel devices have had success in many applications, there exist certain disadvantages in their usage which must be taken into consideration. One of the disadvantages of electroluminescent panels is that they generally require separate sources of voltages for exciting the electroluminescent layer and for addressing the panel. This dual voltage supply requirement represents a considerable current drain. Another problem ascribed to electroluminescent panels is that they tend to exhibit crosstalk. That is, crosspoints adjacent to the selected crosspoint in the grid emit light as a result of random currents to a disturbing degree causing unreliable visual data. Thus, satisfactory isolation of crosspoints in electroluminescent displays is an objective which remains elusive.

The disadvantages of the aforementioned electroluminescent devices have been overcome by the present invention wherein a color visual display is obtained upon a panel by electrophoretic migration of charged particles. Electrophoresis is defined as the movement of charged particles suspended in a liquid under the influence of an applied electric field. If the electric field is applied between electrodes in a cell, the particles will migrate, depending on their polarity, to either the cathode or the anode whereas the liquid medium remains essentially stationary.

Finely divided particles when dispersed in an insulating liquid will become triboelectrically charged by contact with the liquid. However, in order to obtain high-quality images with good resolution on the display device special precautions must be observed in selecting the particle charge, size and color and the viscosity of the insulating liquid.

BRIEF DESCRIPTION OF THE INVENTION

The matrix addressable electrophoretic color display panel of the present invention provides a flat panel having a depth of less than one-half inches which has high storage capabilities, isolation between selected and unselected electrodes and the capacity to be made into large sizes. In addition, the present invention provides a panel in which a first plurality of parallel conductive lines insulated from each other are mounted on a substrate. Overlying each conductive line and in contact therewith is a layer of electrophoretic ink comprising charged particles dispersed in a clear or opaque dielectric medium. Overlying the layer of electrophoretic ink are a plurality of spaced transparent conductors which are positioned angularly in relation to the conductive lines. Lastly, there is a layer of transparent material from which side the panel is viewed, overlying the transparent conductors. Alternately, the panel may be viewed from the line conductor side where they are made transparent.

When a coincident voltage is applied to selected electrodes the colored charged particles in the dielectric medium migrate under the influence of the electric field, to the electrode having a polarity opposite from their own. Since the selection of electrodes will generally relate to an image or pattern, the particles form an image or pattern which may be viewed through the transparent conductor side of the panel. The invention also provides storage of the image on the electrodes after the source of potential is removed. In addition, means are provided for reversing the polarity of the source of potential and thus the color displayed on the panel. Means are also provided for controlling the charge on the particles themselves and for erasing the image from the panel when desired.

Accordingly, it is an object of this invention to provide an electrophoretic color display device which is easy to manufacture, furnishes isolation between addressable coordinates and which furnishes images having good contrast.

It is also an object of this invention to provide an electrophoretic color display device which has high storage capability and resolution.

Another object of this invention is to provide an electrophoretic color display device which has controllable charged particles.

Another object of this invention is to provide an electrophoretic display device which has charged particles of different color pigments.

Yet another object of this invention is to provide an electrophoretic color display device which has low current drain.

These and further objects of the present invention will be more fully understood by reference to the description which follows and the accompanying drawings wherein:

FIG. 1 depicts an isometric view of a panel segment showing the elements thereof;

FIGS. *2a–2d* are side views of a single conductive line showing the migration of particles when subjected to an electric field.

FIG. *3a* is a view similar to FIG. 1 showing a multilayer electrode system;

FIGS. *3b* and *3c* show simplified particle migration threshold curves, and

Figure 4:
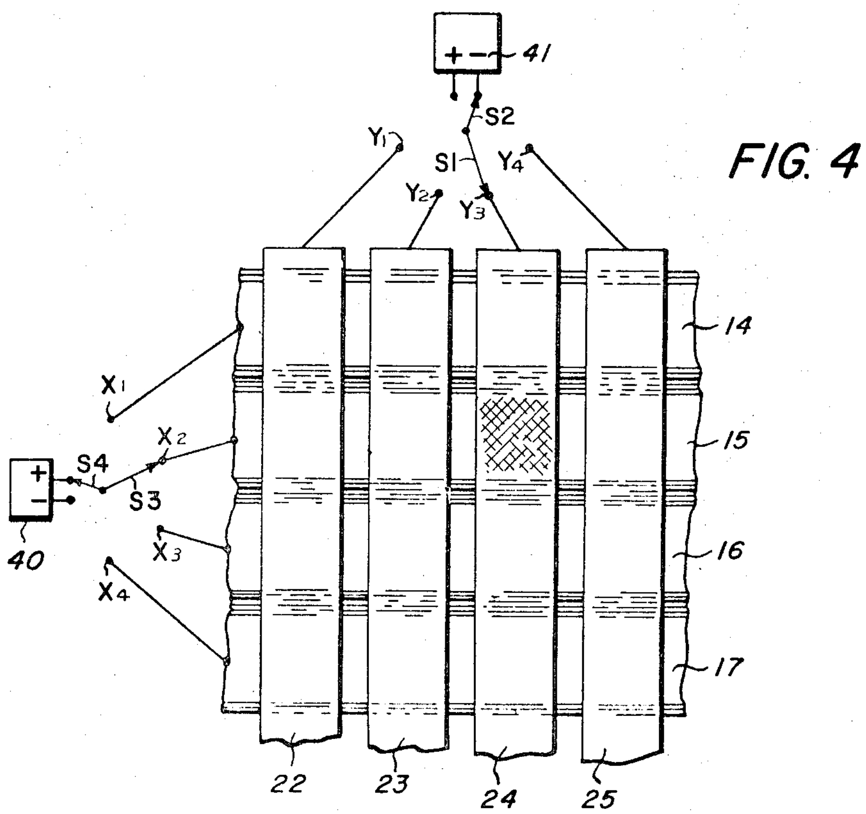

FIG. 4 is a plan view similar to FIG. 1 showing the wiring input terminals to the matrix grid.

Referring to the drawing wherein like reference numerals designate the same elements throughout the several views, there is shown in FIG. 1 at numeral 10, a section of the electrophoretic panel of the invention. It is to be understood that the panel section at 10 has been greatly magnified for the sake of explanation and illustration. Reference numeral 11 is a substrate or support means which may be glass, polystyrene or any other suitable nonconductor. The thickness of support 11 is not critical but it should have sufficient strength to support the elements which are mounted upon it. Support means 11 is generally planar and conductive lines 14, 15, 16 and 17 are placed thereon parallel to each other in the manner shown.

The conductive lines are insulated from each other and bound to substrate 11 by an epoxy or other adhesive 12. Each conductive line is coated with an insulating layer 13 which has been abraded to expose the top of the conductive material. Then portions of the conductive material and insulating layer are etched away so that each wire line is contained in a trough or reservoir made of the insulating material 13. The volume above the conductive material in the trough is filled with a dielectric fluid or electrophoretic ink 18, 19, 20 and 21, which may contain particles of one color or a mixture of different-colored particles. The dielectric fluid may be clear or opaque and may also contain a control liquid or additive for charging the pigment particles dispersed in it. A dielectric fluid containing a dye of contrasting color with the particles dissolved in a solvent dye may be employed in order to increase contrast. Overlying the dielectric fluid and in an electrical contact therewith are transparent conductors 22, 23, 24 and 25. Lastly, a layer of transparent glass 27 from which side the panel is viewed overlies the transparent conductors 22–25.

The conductive material of conductive lines 14–17 may be any good electrically conductive material such as aluminum, copper, silver, platinum, brass or steel alloys. Insulating material 13 is preferably selected so that it is capable of withstanding the etching agents used to form the trough. The transparent conductors 22–25 may comprise thin layers of tin oxide, copper oxide, copper iodide, or gold either alone or on a transparent substrate.

The dielectric fluid preferably should be substantially free of ions and not create ions when subjected to high voltages if excessive current drain is to be prevented. The dielectric fluid should also preferably have minimum solvent action on pigments used, a specific gravity greater than or equal to the pigment particles and miscibility with the control agents or additive when these are used.

Among typical insulating liquids which are useful with many pigments are decane, dodecane, N-tetradecane, Dow Corning 200 silicon fluid (dimethyl polysiloxane), xylene, Sohio odorless solvent (a kerosene fraction available from Standard Oil Company of Ohio), toluene, hexane and Isopar G (a long chain saturated aliphatic hydrocarbon available from Humble Oil Company of New Jersey).

The device parameters are chosen so that visual data having high quality and resolution can be achieved with voltages in the range from 6 to 600 volts. However, the required voltage varies depending upon the constituents utilized and the electrode spacing.

The pigment particles preferably should have stable properties, single polarity, narrow particle-size distribution for better contrast and resolution, dispersibility, and adequate color and density. Typical inorganic pigments are:

Barium sulfate (white)
Cadmium Red
Cadmium sulfo-selenide (black)
Calcium silicates (white)
Chromium oxide (green)
Iron oxides (black)
Iron oxides (red)
Lead Chromate (yellow)
Manganese dioxide (brown)
Selenium (arsenic doped)
Silicon monoxide (reddish brown)
Sulfur (yellow)
Vermilion Red
Zinc Oxide (white)
Zirconium oxide Among typical organic pigments are:

Anthracene (fluorescent blue)
Anthracene (fluorescent yellow)
Phthalocyanine Blues
Phthalocyanine Greens In the practice of the invention the pigment particles are not intended to be sensitive to light. Therefore, where photosensitive pigment particles are used corrective filters may be necessary to avoid any sensitivity to ambient lighting.

In a preferred embodiment a control agent may be added to the particle suspension to increase their charge in suspension or make more of them charge to one polarity. The control agent or additive is a superficial coating or film supplied to the particles in suspension and its function is to regulate the migration of the particles toward the electrodes. The control agent is applied to the particles in suspension by adsorption and is generally added to the insulating liquid just prior to the dispersion or milling of the pigment particles. Some typical control agents are listed in table 1 below:

TABLE 1

| Control Agent | Polarity Conferred | Liquid Medium | Toner |
|---|---|---|---|
| Linseed oil | Negative | Gasoline, cyclohexane pentane, $CCl_4$ | Carbon black lead chromate |
| Alkyd resin (Rhodine) | Positive | Kerosene cyclohexane pentane, $CCl_4$ | Phthalocyanine blue, carbon black |
| Versamid (polyamide resin) | Positive | Aliphatic hydrocarbon | Charcoal |
| Polyethlene | Negative | Aliphatic hydrocarbon | Charcoal |
| Shelac | Negative | Aliphatic hydrocarbon | Charcoal |

Other typical insulating liquids and pigment particles are disclosed in U.S. Pat. Nos. 3,145,156; 3,383,993; 3,384,565 and 3,384,566. The manner in which the particles are given a unipolar charge is disclosed in greater detail by Dessauer and Clark, "Xerography and Related Processes," Pages 271–273, 313–318358–363 (1965) Focal Press, New York, New York.

Figure 2A:
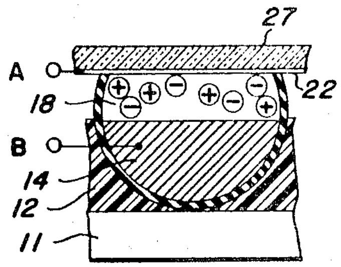
Figure 2B:
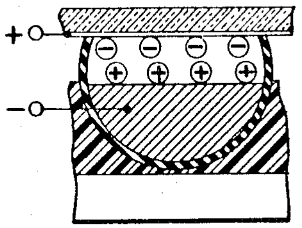
Figure 2C:
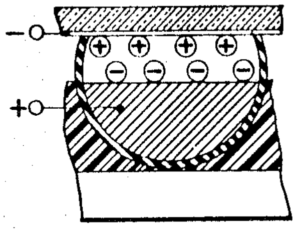

FIGS. 2a–2c are side views of a single conductive line 14 with dielectric fluid 18 having particles in suspension filling the trough or reservoir formed by insulating material 13 and conductor 14. Transparent conductor 22 overlies the trough and glass layer 27 in turn overlies the transparent conductor. In FIG. 2a the particles have been arbitrarily given polarity signs for purposes of explanation. Moreover, FIG. 2a represents the particles as being randomly dispersed within the dielectric fluid. A control agent or additive may or may not be needed to give the particles the desired charge, since particles may be chosen which take on an initial charge triboelectrically in the fluid. When a positive source of potential is applied to terminal A and a negative source of potential is applied to terminal B as shown in FIG. 2b, an electric field is established across the electrodes. Under the influence of the electric field the particles having a negative charge migrate toward the positive electrode, whereas the particles having a positive charge migrate towards the negative electrode. This results in an image which is the reverse of the other on each of the electrodes. Upon reversal of the electric field as shown in FIG. 2c the particles migrate to the terminal having a polarity opposite to their own. For a period of time after the removal of the electric field the particles adhere to the electrode toward which they have migrated. In order to clear or erase the electrode, a potential of the same polarity as the charged particle is applied to the electrode. During this operation, the other electrode may be maintained at ground potential. The amount of particles adhering to the electrodes is a function of the applied voltage as well as the number of available particles.

Assuming that the negative particles shown in FIGS. 2a–2c are blue, the positive particles are yellow and the dielectric fluid colorless, then the cell viewed from 27 of FIG. 2a would appear green as expected. When a positive voltage is applied to terminal A and a negative voltage is applied to terminal B of FIG. 2b, the cell viewed from 27 appears blue. Conversely, when the voltage is reversed, as in FIG. 2c, the cell as viewed from 27 appears yellow. Alternately, the system may provide only a monochrome scheme or a scheme consisting of more than two colors.

Figure 2D:
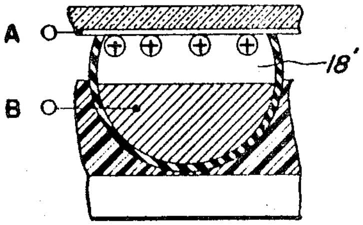

In FIG. 2*d* there is shown a side view of a single conductive line such as shown in FIGS. 2*a*–2*c* with the exception that a monochromic fluid dye 18' is utilized in lieu of one of the color particles of FIGS. 2*a*–2*c*. In other respects FIG. 2*d* is identical to FIGS. 2*a*–2*c*. If we assume that the particles in FIG. 2*d* have a positive polarity as shown, then when a negative potential is applied to terminal A and ground to terminal B, the particles will migrate toward the upper electrode in sufficient numbers to furnish an indication of a color change in the conductive line different from its previous condition. So if we assume further that the fluid dye 18' was white and that the particles were carbon black then applying the negative potential to the upper electrode would result in the cell at 27 appearing black.

A fluid dye and single-polarity particle system provides better contrast. Moreover, a single-polarity system does away with particle migration interference because all particles are migrating in one direction under the influence of the electric field. Whereas in dual-polarity particle systems particle migration speed is reduced because of interference between opposite charged particles moving in different directions under the influence of the electric field.

Figure 3C:
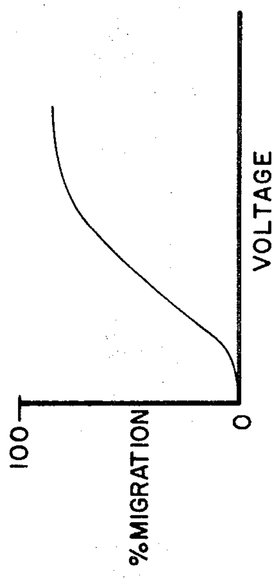
Figure 3B:
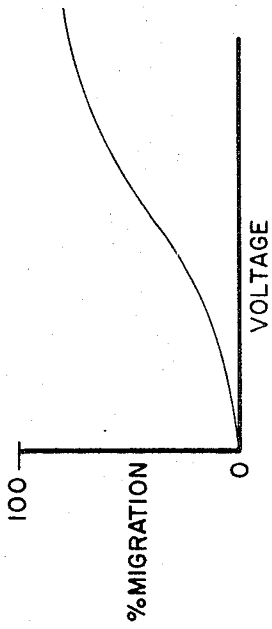
Figure 3A:
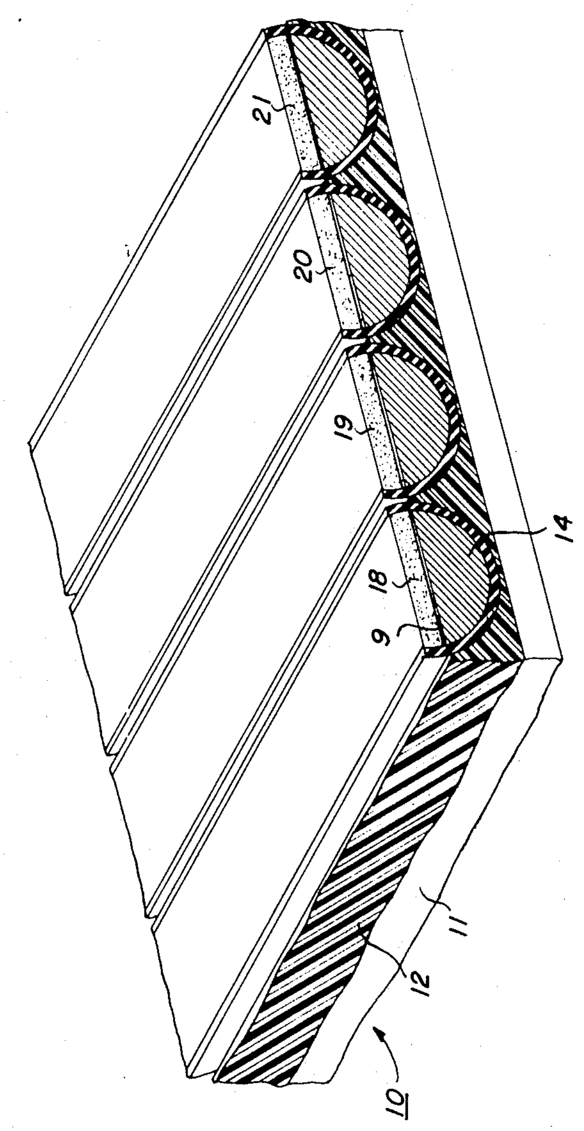

FIG. 3*a* illustrates the panel segment with the glass layer and transparent conductors removed and also shows the multilayer electrodes. In FIG. 3*a* the electrophoretic ink overlying the conductive lines 14, 15 and 16 may have color pigment particles of red, green and blue respectively in a colorless dielectric fluid. Assuming a two-color system, the other pigment particles may be carbon black so that when any one of these conductive lines is pulsed with a voltage of the required polarity the color in that line appears on the display. The pigment particles used in all embodiments of the invention may or may not be fluorescent.

Part 9 in FIG. 3*a* is an additional conductive layer which overlies conductive lines 14, 15 and 16. The purpose of this layer is to enhance the threshold migration of the pigment particles. In the multilayer electrode arrangement of FIG. 3*a*, part 9 may be selenium and the conductive lines or backing layer 14, 15 and 16 may be aluminum. It has been discovered that the utilization of a multilayer electrode structure sharpens the threshold migration of the pigment particles. The exact mechanism for this effect is not fully understood. However, one explanation may be that charges are injected at the pigment-selenium interface into the particles giving them added attraction toward the electrodes. It has also been discovered that the field necessary for particle migration in a multilayer system operation are smaller (on the order of 0.5 v./micron) than the fields involved in other systems (on the order of 5 v./micron).

FIGS. 3*b* and 3*c* show the curves of particle migration in both a single and multilayer electrode system. In FIGS. 3*b* and 3*c* the ordinate represents percent of particle migration and the abscissa represents voltage. FIG. 3*b* is a single-layer electrode curve and FIG. 3*c* is a multilayer electrode curve. It is seen from the two curves that the particle migration threshold is sharpened in a multilayer electrode system. The threshold for a preferred embodiment is on the order of 100 volts with a 6-mil spacing between the electrodes. The selenium layer of the multilayer electrode has a thickness of 2 mils in the preferred embodiment. The preferred embodiment also has particle sizes of approximately 3 to 5 microns in a suspension containing 0.32 parts of arsenic-doped selenium particles having a black color and a negative polarity; 0.33 parts of anthracene particles having a yellow color and a positive polarity; 9.35 parts of Dow Corning 0200 dielectric fluid; and 8.0 parts saturated solution of Sudan Black in Sohio solvent. The curves of FIGS. 3*b* and 3*c* have been greatly exaggerated for purposes of illustration. However, they clearly indicate that the multilayer electrode furnishes enhanced threshold particle migration.

FIG. 4 is a plan view of the panel segment illustrating in schematic fashion a means of addressing the panel. Conductive lines 14, 15, 16 and 17 are shown as having terminals $X_1$, $X_2$, $X_3$, and $X_4$ respectively. Switch arms $S_3$ and $S_4$ connect negative or positive potential from power supply 40 to any one of the X terminals. Similarly, switch arms $S_1$ and $S_2$ connect negative or positive potential from power supply 41 to terminals $Y_1$, $Y_2$, $Y_3$ and $Y_4$ which are connected respectively to transparent conductors 22, 23, 24 and 25.

Although switches $S_1$–$S_4$ are shown as mechanical devices, the invention is not intended to be limited thereto. It will occur to those skilled in the art that electronic devices such as vacuum tubes or transistors could be substituted in lieu thereof. Moreover, logic circuits may be used to address the panel in order to process numerous types of input data. It is therefore within the scope of the invention to employ electronic switching and logic processing circuits where it is desired.

In operation of FIG. 4 it shall be assumed that the crosspoint $X_2$, $Y_3$ is to be addressed and that the pigment particle colors yellow and blue in a colorless dielectric fluid are to be alternately displayed. Initially the panel as viewed facing the transparent conductor will appear greenish. For the purpose of this illustration the yellow pigments particles are assumed to have a positive charge and the blue pigments particles are assumed to have a negative charge.

In order to address crosspoint $X_2$, $Y_3$, and bring the color yellow into view $S_2$ is switched to the negative terminal of power supply 41. $S_1$ is then brought into contact with terminal $Y_3$. Simultaneously or subsequently $S_4$ is switched to the positive terminal of power supply 40 and $S_3$ is switched to terminal $X_2$ of conductive line 15. The electrodes at the crosspoint $X_2$, $Y_3$ will have an electric field established across it. The yellow and blue pigment particles which were initially randomly dispersed in the dielectric fluid will become ordered to migrate toward the electrode bearing a polarity opposite to their own. Specifically, the yellow pigment particles bearing a positive charge will migrate to the transparent conductor which at this time has a negative polarity impressed upon it. On the other hand, the blue pigment particles bearing a negative charge are attracted to the conductive line which at this time has a positive polarity impressed upon it. Now, when $S_2$ and $S_4$ are reversed and $S_1$ and $S_3$ remain stationary the color blue will appear at crosspoint $X_2$, $Y_3$.

The voltage necessary to cause particle migration may range between 6–600 volts. The actual voltage needed depends on circuit parameters which included among other factors, the insulating liquid and the particle size. Speed of particle migration has been shown to depend on, among other factors, spacing between the electrodes, the insulating liquid, the control agent, the applied electric field and the particle size.

When the voltage is removed from the panel, the particles will adhere for long periods of time to the electrodes to which they have migrated. The mechanism of this storage capability of the electrophoretic panel is not definitely known but it is theorized that the pigment particles have inherent adhesive properties or that they adhere as a result of Van der Waals forces. In order to clear or erase the electrodes of adhering particles all that is necessary is to place a potential on the electrode having a polarity identical to the charge on the adhering particles.

Since particles will migrate only in the areas where an electric field greater than the threshold field is established, crosstalk between adjacent coordinates is virtually eliminated. Moreover, since there is an extremely small current flow between the electrodes due to the insulating properties of the fluid medium, current drain is of minute proportions.

It is understood that FIGS. 1–4 represent only a portion of an actual electrophoretic color display device. In an actual display panel having a dimension, for example of 5×5 feet or larger, the conductive lines and the transparent conductors would be far more numerous giving access to more panel coordinates. In the actual display device numerous segments of the panel are addressed or scanned sequentially or simultaneously so as to build up visual information on the panel. The voltage to individual address terminals may also be modulated to control the brightness of the panel and to furnish degrees of contrast and resolution of visual data.

It is further understood that a solid dielectric layer may overcoat the electrodes preventing them from contacting the insulating fluid. In such an event, the layer may serve to avoid any adverse effects that the fluid may have on the electrodes (e.g. corrosion) or to furnish the required insulating properties under certain voltage conditions.

Form the foregoing, it has been demonstrated that the invention provides a matrix addressable panel which is capable of displaying visual information in color by electrophoretic particle migration.

What is claimed is:

1. A visual display device comprising:
a colorless insulating fluid containing particles of at least one color pigment in suspension, a substantial amount of said particles having a charge of one polarity;
first electrodes;
second electrodes spaced from said first electrodes, said fluid disposed between said first and second electrodes; and
means for selectively applying an electrical field across individual ones of said first and second electrodes whereby said particles migrate to the electrodes having a polarity opposite to their own causing a color image to be formed on said electrodes.

2. The apparatus of claim 1 in which said particles have the capability of adhering to said electrodes in imagewise configuration after the removal of said source of potential under the influence of Van der Waals forces.

3. The apparatus of claim 1 in which
said fluid is of a contrasting color with said particles.

4. The apparatus of claim 1 further including means to reverse the polarity of the applied field whereby said particles migrate to the opposite electrodes.

5. The apparatus of claim 1 comprising pigment particles of at least two colors in said fluid substantially all of the pigment particles of one color having a negative charge and substantially all of the pigment particles of the other color having a positive charge.

6. The apparatus of claim 1 in which said particles are fluorescent and in which said electrodes are overcoated with a solid insulating layer.

7. The apparatus of claim 1 comprising pigment color particles in said fluid of yellow and blue.

8. The apparatus of claim 1 comprising means for removing said migrated particles from said electrodes by applying a source of potential to said electrodes having a polarity identical to said migrated particles thereon.

9. A visual display device comprising:
a monochromatic fluid dye,
particles dispersed in said dye, substantially all of said particles having a charge of a given polarity,
first electrodes;
second electrodes spaced from said first electrodes by said dye; and
means for selectively applying a source of potential to individual ones of said first and second electrodes whereby said particles migrate to the electrodes having a polarity opposite to their own in imagewise configuration.

10. A visual panel display device having a depth dimension substantially smaller than its square area dimension comprising:
a dielectric fluid containing particles in suspension, said fluid comprising means for charging triboelectrically substantially all of said particles to a first and second polarity;
first electrodes;
second electrodes spaced from said first electrodes by said fluid; and
means for applying an electrical field across selected ones of said first and second electrodes causing said particles to migrate toward the electrodes having an opposite polarity whereby an image is formed on said electrodes.

11. A visual device comprising:
a first plurality of electrodes comprising spaced conductive elements insulated from each other;
a nonconductive fluid having color pigment particles homogeneously dispersed therein overlying said first electrodes and means for restricting said fluid thereto, substantially all of said particles having a charge of a given polarity;
a second plurality of electrodes comprising spaced transparent conductors positioned angularly to said first electrodes and spaced from said first electrodes by said fluid; and
means for applying an electrical field across selected ones of said first and second electrodes whereby said pigment particles migrate in imagewise configuration to the electrodes having a polarity opposite from their own.

12. A visual panel display device comprising:
a first plurality of electrodes comprising spaced parallel conductive elements insulated from each other;
a dielectric fluid having at least two color pigment particles homogeneously dispersed therein, said pigments of differing color being oppositely charged;
means in said fluid for furnishing a charge of a first or second polarity to individual ones of said particles;
a second plurality of electrodes comprising spaced transparent conductors spaced from said first plurality of electrodes by said fluid and positioned transversely in relation to said first plurality of electrodes; and
means for applying an electrical field across selected ones of said first and second electrodes whereby said charged particles migrate electrophoretically in imagewise configuration to the electrodes having a polarity opposite to their own.

13. The apparatus of claim 12 comprising a multilayer structure on said plurality of first electrodes whereby the threshold migration of said particles is sharpened.

14. The apparatus of claim 13 wherein said multilayer structure includes a selenium layer overlying a layer of aluminum.